United States Patent [19]

Hartmann

[11] Patent Number: 4,881,750

[45] Date of Patent: Nov. 21, 1989

[54] ATB SHOCK ABSORBER

[76] Inventor: Dirck T. Hartmann, 4121 Morning Star Dr., Huntington Beach, Calif. 92649

[21] Appl. No.: 306,913

[22] Filed: Feb. 6, 1989

[51] Int. Cl.$^4$ .............................................. B62K 21/20
[52] U.S. Cl. ..................................... 280/276; 188/269; 267/64.26
[58] Field of Search ....................... 280/276, 277, 275; 267/64.26; 188/269

[56] References Cited

U.S. PATENT DOCUMENTS

| | | | |
|---|---|---|---|
| 689,970 | 12/1901 | Horack | 280/276 |
| 2,233,313 | 2/1941 | Hazelroth | 280/276 |
| 3,243,006 | 3/1966 | Sparks | 280/276 |
| 3,722,874 | 3/1973 | Kress | 267/64.26 |
| 3,936,076 | 2/1976 | Probst | 280/276 |
| 4,815,763 | 3/1989 | Hartmann | 280/276 |

Primary Examiner—Mitchell J. Hill

[57] ABSTRACT

The headset of a conventional All Terrain Bicycle is modified to permit the load supported by the front wheel to be transferred to the bicycle frame through a column of compressed air to minimize the shock and vibration to the rider when riding over rough ground. A valve matching those in the bicycle tires is located on the centerline of the steering axis above the handle bar stem and permits the compressed air pressure to be adjusted for different rider weights through use of a conventional bicycle pump. The typical air pressure required is less than the tire pressure. This IMPROVED ATB SHOCK ABSORBER includes provisions for hydraulically damping the air spring motion. The shock absorber design should permit hard use for long periods without maintenance.

4 Claims, 1 Drawing Sheet

ATB SHOCK ABSORBER

BACKGROUND OF THE INVENTION

1. Field of the Invention

This invention relates generally to All Terrain and Mountain Bicycles and to a means for softening the ride over rough ground without sacrificing pedaling effeciency.

2. Description of the Prior Art

The only shock absorbtion feature of the most widely used ATBs is that provided by oversize tires and the flexibility of the front forks. One model in limited production adds flexibility to the frame to soften the ride by replacing the down tube with one or two steel cables which terminate in compression springs under the bottom bracket, and adding a kevlar flexure at the joint between the top tube and the seat tube to allow the frame to flex without breaking. Another model uses a Hannebrink rear suspension which transfers load on the rear wheel to the frame through a shock strut and pivot for the chain stays, and which allows the rear wheel to bounce with minimum disturbance to the frame. The cable/spring arrangement provides a slight softening of the ride coupled with a modest reduction in pedaling efficiency, while the Hannebrink system provides major shock absorbtion with a considerable reduction in both traction and pedaling efficiency. Adding flexibility anywhere along the load path between the handlebars, bottom bracket and rear wheel detracts from pedaling efficiency because the loads imposed by pedaling flex the structure, which absorbs energy and reduces the portion of pedal power delivered to the rear wheel. Therefore, the only way to soften the ride of ATBs without sacrificing pedaling efficiency is to add shock absorbtion to the front fork, while maintaining the frame, handlebars to rear wheel, as stiff as possible.

SUMMARY OF THE INVENTION

The Improved ATB Shock Absorber in accordance with the present invention includes a separate steering tube which is installed in the head tube of a conventional bicycle frame with angular contact ball bearings at the upper and lower ends of the steering tube maintaining its axial position and alignment in the head tube. The bearing preload is adjusted with a bearing nut threaded on the upper end of the steering tube and secured with a locknut. The steering tube threads extend above the locknut and engage a flanged nut which clamps a flanged plug in the open upper end of the steering tube. A pair of integral extentions on the steering tube extend up through slots in the flange of the plug and provide indexing and torque transfer between the flanged plug and the steering tube. A fork tube, which is rigidly clamped to the fork crown, has four external axial ribs which extend upward through four slots through an integral flange inside the lower end of the steering tube. The ribs provide indexing and torque transfer between the steering tube and fork tube while permitting axial sliding of the fork tube. External threads on the upper end of the fork tube engage internal threads on the lower end of a fork tube extension. Fork tube deployment is stopped when the end of the fork tube extension engages the flange inside the lower end of the steering tube. A sealant on the threads prevents compressed air leakage between the extension and the fork tube. A seal on the upper end of the fork tube extension prevents compressed air leakage between the extension and the steering tube.

The threaded upper end of a damper tube extends up through the flanged plug and a nut clamps a sealed flange on the damper tube against the under side of the flanged plug. A cylindrical extension on the handlebar stem fits snugly in a bored hole in the center of the flanged plug with a flange on the handlebar stem seated against the top of the flanged plug. A flanged nut threaded on the upper end of the damper tube clamps the handlebar stem in position and a shear pin provides indexing and torque transfer between the plug and handlebars.

The damper tube extends down through the center of a floating piston. A special screw with its head shaped to provide damping is installed in the bottom end of the damper tube and restrains the downward travel of the floating piston. A spring on the damper tube holds the floating piston against the screw to aid assembly. Seals on the piston engage the surfaces of the damper tube and fork tube and prevent leakage past the piston. A valve matching the tire valves is installed in the upper end of the damper tube and permits pressurizing the volume between the flanged plug and the floating piston with compressed air.

A plug with a flange is threaded into the bottom end of the fork tube and clamps the four axial ribs on the fork tube in radial slots in the fork crown. The volume below the floating piston is filled with hydraulic fluid and a sealant on the plug threads prevents leakage. A bolt with a seal is installed in the center of the threaded plug to permit draining and refilling the fluid.

During upward stroking of the fork tube, hydraulic fluid flows past the head of the special screw and drives the floating piston up the damper tube against the resistance of the compressed air. A small upward axial travel of the floating piston relative to the fork tube occurs during upward stroking of the fork tube and compensates for the volume displaced by the damper tube.

An external seal is installed in a cylindrical extension of the flanged plug. When the inside diameter of the fork tube extension slides past this seal, the air trapped between the flanged plug and the fork tube extension limits the upward travel of the fork tube, preventing the shock absorber from bottoming out.

An elastomeric boot is installed between the steering tube and the fork crown to prevent the intrusion of contaminates.

DESCRIPTION OF THE PREFERRED EMBODIMENT

Figure 1:
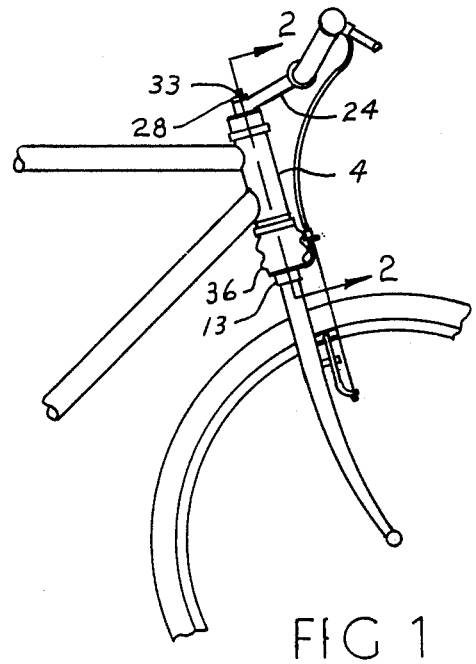
FIG. 1 is a partial side elevation view of a bicycle with the Improved ATB Shock Absorber according to the present invention in the head tube.
Figure 2:
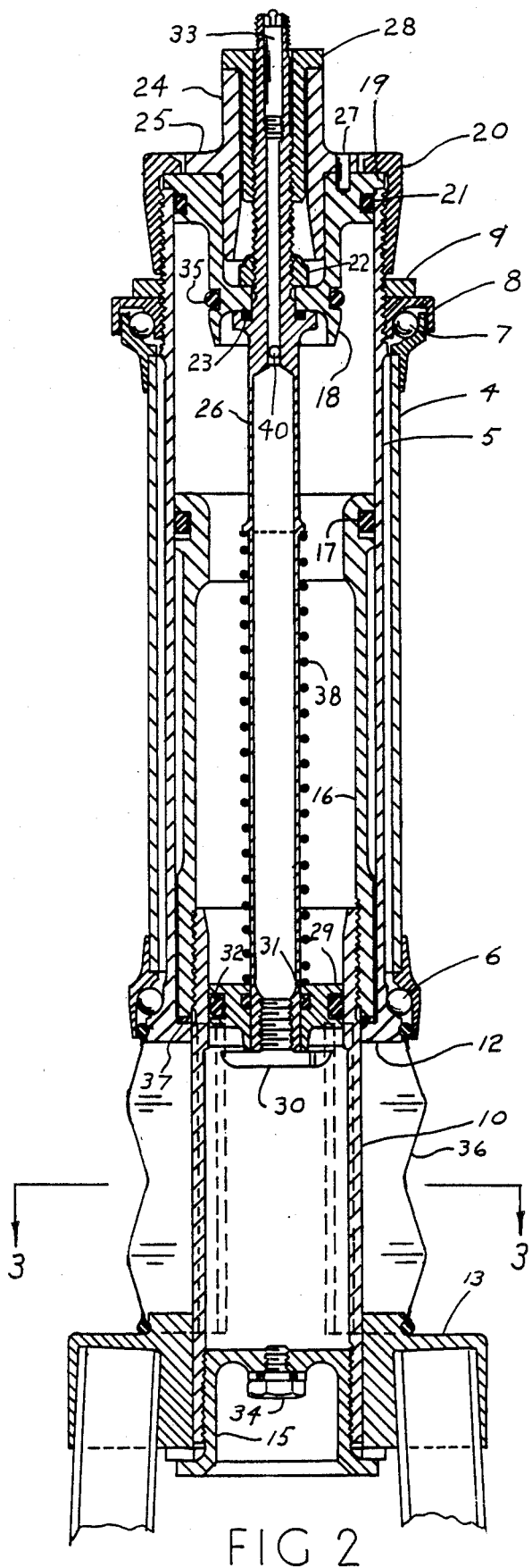
FIG. 2 is an enlarged sectional view taken along the line 2—2 of FIG. 1
Figure 3:
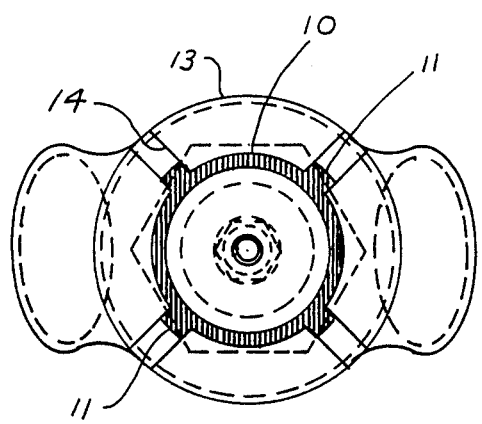
FIG. 3 is a sectional view taken along the line 3—3 of FIG. 1

Referring to FIG. 2, the Improved ATB Shock Absorber in accordance with the present invention, includes a steering tube 5 mounted in a head tube 4 on angular contact ball bearings 6 and 7. The bearing preload is adjusted with a bearing nut 8 and secured with a locknut 9. A fork tube 10, as shown in FIGS. 2 and 3, has four axial ribs 11 which terminate at their lower ends in shallow milled slots 14 in a fork crown 13. The flanged plug 15 is threaded into the lower end of the fork tube 10 and preloads the ribs 11 against the bottom of the milled slots 14 and, with a sealant on the threads, seals the lower end of the fork tube against leakage. The ribs 11 extend upward through four slots in an inward facing flange 12 in the steering tube 5, and provide indexing and torque transfer while allowing axial sliding of the fork tube relative to the steering tube. A fork tube extension 16 is threaded on the upper end of the fork tube 10 with internal threads on the extension 16 engaging external threads on the fork tube 10. The lower end of the extension 16 clamps the washer 37 against the upper ends of the axial ribs 11 on the fork tube 10. Engagement of the washer 37 with the flange 12 on the steering tube 5 limits the downward travel of the fork tube. Sealant on the threads prevents leakage through the threaded joint, and a conventional hydraulic "O" ring 17 on the upper end of the extension 16 prevents leakage between the extension 16 and the steering tube 5. A plug 18 is located in the upper end of the steering tube 5 with a flange 19 on the plug seated against the end of the steering tube 5. A pair of diametrically opposed slots through the flange 19 receive integral extensions of the steering tube 5, which provide indexing and torque transfer between the steering tube and the plug 18. A flanged nut 20 clamps the plug 18 in position and a seal 21 prevents leakage between the plug 18 and the steering tube.

A damper tube 26 is located on the steering axis with an integral flange on the damper tube 26 seated against the under side of the sealing plug 18. A self locking nut 22 clamps the damper tube 26 in position and a seal 23 prevents leakage between the sealing plug and the damper tube. A bored hole in the center of the sealing plug 18 receives a cylindrical extension of a handlebar stem 24 with an integral flange 25 on the handlebar stem seated against the top of the sealing plug 18. A shear pin 27 provides indexing and torque transfer between the handlebar stem 24 and the sealing plug 18. A flanged nut 28 is threaded on the upper end of the damper tube 26 and clamps the handlebar stem in position. A conventional pneumatic valve 33 is installed inside the upper end of the damper tube 26 and permits pressurizing the inside of the steering tube 5 via a transverse hole 40 in the damper tube 26 with a bicycle pump.

A floating piston 29 is located on the lower end of the damper tube 26. A conventional hydraulic "O" ring seal 31 is installed in the I.D. of the floating piston 29 and seals against the damper tube 26, and an "O" ring 32 is installed on the O.D. and seals against the fork tube 10. A damper head 30 is threaded into the bottom end of the damper tube 26 and a compression spring 38 holds the floating piston 29 against the damper head 30 to facilitate assembly.

The volume below the floating piston 29 is filled with hydraulic fluid or light oil. The volume above the floating piston is filled with compressed air with the pressure adjusted so that the weight of the motionless rider produces a small shortening from the fully deployed length. Upward motion of the fork tube extension 16 is limited when the I.D. of a reduced diameter portion of the extension 16 passes an "O" ring seal 35 on the sealing plug 18, by the rapid buildup of pressure in the annular volume of air trapped above the end of the extension 16. This arrangement cushions bottoming out of the shock absorber.

The I.D. of the reduced diameter portion of the fork tube extension 16 matches the I.D. of the fork tube 10 engaging the floating piston 29. Thus the sealing plug 18 with the damper tube 26 and the handlebar stem 24 attached, can be removed as a complete assembly from the steering tube 5 by removing the flange nut 20. The damper head 30 and the floating piston 29 can therefore be easily removed if it is desired to ride without hydraulic damping for maximum shock and vibration isolation. The sealed bolt 34 in the flanged plug 15 which clamps the fork tube 10 to the fork crown 13, permits draining and re-filling the hydraulic fluid without removing the sealing plug 18.

An integral seal on the upper end of an elastomeric boot 36 is installed in a circumferential groove in the lower end of the steering tube 5, and an integral seal on the lower end of the elastomeric boot 36 is installed in a circumferential groove in the fork crown 13 to prevent the intrusion of dirt. The configuration of this Improved ATB Shock Absorber should permit hard use for long periods in dusty areas without maintenance.

While this invention has been described in terms of a preferred embodiment, it is anticipated that persons skilled in mechanical design will realize many possible modifications thereof. It is therefore intended that the following appended claims be interpreted as including all such modifications as fall within the true scope and spirit of the present invention.

I claim:

1. In an All Terrain Bicycle with a conventional frame including a head tube and a front fork, an ATB Shock Absorber providing an improved means of shock and vibration isolation and comprising:

a separate steering tube mounted on angular contact ball bearings in said head tube;

a fork tube slidably mounted inside said steering tube with a means for transferring torque from said steering tube to said fork tube;

a fork crown rigidly fastened on the lower end of said fork tube with a means for sealing the lower end of said fork tube.

a fork tube extension rigidly fastened on the upper end of said fork tube and slidably mounted inside said steering tube, with a sealant means for sealing against the loss of compressed air between said fork tube and said fork tube extension;

a seal installed on the upper end of said fork tube extension preventing the loss of compressed air between said fork tube extension and said steering tube;

a plug rigidly clamped in the upper end of said steering tube and a means for sealing between said plug and said steering tube against the loss of compressed air;

a damper tube rigidly clamped to said plug with a length of said damper tube extending up through the center of said plug, and a length of said damper tube extending down inside the upper end of said fork tube;

a means for sealing against the loss of compressed air between said damper tube and said plug;

a floating piston slidably mounted on said damper tube with a means for preventing the passage of any compressed air or any hydraulic fluid past said floating piston;

a spring holding said floating piston against a damper head fastened in the lower end of said damper tube.

a pneumatic valve installed inside the upper end of said damper tube with an air passageway connecting said pneumatic valve with the inside of said steering tube;

a handlebar stem rigidly clamped to said plug with a short length of the damper tube extending above said handlebar stem;

a short length of the upper end of said fork tube extension having reduced inside diameter;

a portion of said plug with a reduced outside diameter extending a short distance down from the top end of said steering tube with the upper end of said fork tube extension sliding over said reduced outside diameter portion of said plug near the upper end of the shock absorber stroke;

a seal on said plug trapping an annular volume of air between said plug and said fork tube extension near the end of the shock absorber stroke; and an elastomeric boot installed between said steering tube and said fork tube to prevent the intrusion of dirt.

2. An Improved ATB Shock Absorber according to claim 1 wherein said means for transferring torque from said steering tube to said fork tube includes an inward facing flange on the lower end of said steering tube; multiple axial slots through said inward facing flange; and multiple axial ribs on said fork tube extending up through said axial slots.

3. An Improved ATB Shock Absorber according to claim 1 wherein said means for sealing between said fork tube and said fork tube extension includes external threads on the upper end of said fork tube engaging internal threads on the lower end of said fork tube extension with a suitable sealant on said threads.

4. An Improved ATB Shock Absorber according to claim 1 wherein said means for sealing the lower end of said fork tube includes internal threads on said fork tube engaging external threads on a flanged plug with said plug clamping said fork tube 1 to said fork crown, and with a suitable sealant on said threads.

* * * * *